United States Patent [19]

Aaron et al.

[11] 3,752,970

[45] Aug. 14, 1973

[54] DIGITAL ATTENUATOR

[75] Inventors: Marvin Robert Aaron, Fair Haven, N.J.; Hisashi Kaneko, Tokyo, Japan

[73] Assignee: Bell Telephone Laboratories, Incorporated, Murray Hill, N.J.

[22] Filed: Dec. 22, 1971

[21] Appl. No.: 210,795

[52] U.S. Cl. ............. 235/152, 179/15 AV, 235/156

[51] Int. Cl. .............................................. G06f 7/39

[58] Field of Search ................ 235/152, 156, 92 SH, 235/92 CP; 179/15 AV

[56] References Cited

UNITED STATES PATENTS

| | | | |
|---|---|---|---|
| 3,688,097 | 8/1972 | Montgomery ....................... | 235/152 |
| 3,251,983 | 5/1966 | Constant et al. ................ | 235/156 X |
| 2,768,352 | 10/1956 | Sivers et al. ................ | 179/15 AV X |

*Primary Examiner*—Malcolm A. Morrison
*Assistant Examiner*—James F. Gottman
*Attorney*—W. L. Keefauver

[57] ABSTRACT

Attenuation is performed directly on a compressed PCM code by means of a circuit which treats the characteristic bits and the mantissa bits in accordance with an attenuation algorithm. The characteristic bits are applied to a counter circuit whose output is used to produce a first term of the algorithm and the mantissa bits are applied to a shift register whose output is used to generate a second term of the algorithm. The two terms are added together and used to generate the characteristic bits of the attenuated signal.

10 Claims, 8 Drawing Figures

| | $z^{-2}$ $t_{-2}$ | $z^{-1}$ $t_{-1}$ | $z^0$ $t_0$ | $z^1$ $t_1$ | $z^2$ $t_2$ | $z^3$ $t_3$ | $z^4$ $t_4$ | $z^5$ $t_5$ |
|---|---|---|---|---|---|---|---|---|
| $S_i$ | 1 | 1 | 1 | 1 | 0 | 1 | 1 | 1 |

FIG. 2

8 BIT $\mu$-LAW-POSITIVE OUTPUT LEVELS $y = 2^L (V+16.5) - 16.5$

| V \ L | 0 | 1 | 2 | 3 | 4 | 5 | 6 | 7 |
|---|---|---|---|---|---|---|---|---|
| 0 | 0. | 16.5 | 49.5 | 115.5 | 247.5 | 511.5 | 1039.5 | 2095.5 |
| 1 | 1. | 18.5 | 53.5 | 123.5 | 263.5 | 543.5 | 1103.5 | 2223.5 |
| 2 | 2. | 20.5 | 57.5 | 131.5 | 279.5 | 575.5 | 1167.5 | 2351.5 |
| 3 | 3. | 22.5 | 61.5 | 139.5 | 295.5 | 607.5 | 1231.5 | 2479.5 |
| 4 | 4. | 24.5 | 65.5 | 147.5 | 311.5 | 639.5 | 1295.5 | 2607.5 |
| 5 | 5. | 26.5 | 69.5 | 155.5 | 327.5 | 671.5 | 1359.5 | 2735.5 |
| 6 | 6. | 28.5 | 73.5 | 163.5 | 343.5 | 703.5 | 1423.5 | 2863.5 |
| 7 | 7. | 30.5 | 77.5 | 171.5 | 359.5 | 735.5 | 1487.5 | 2991.5 |
| 8 | 8. | 32.5 | 81.5 | 179.5 | 375.5 | 767.5 | 1551.5 | 3119.5 |
| 9 | 9. | 34.5 | 85.5 | 187.5 | 391.5 | 799.5 | 1615.5 | 3247.5 |
| 10 | 10. | 36.5 | 89.5 | 195.5 | 407.5 | 831.5 | 1679.5 | 3375.5 |
| 11 | 11. | 38.5 | 93.5 | 203.5 | 423.5 | 863.5 | 1743.5 | 3503.5 |
| 12 | 12. | 40.5 | 97.5 | 211.5 | 439.5 | 895.5 | 1807.5 | 3631.5 |
| 13 | 13. | 42.5 | 101.5 | 219.5 | 455.5 | 927.5 | 1871.5 | 3759.5 |
| 14 | 14. | 44.5 | 105.5 | 227.5 | 471.5 | 959.5 | 1935.5 | 3887.5 |
| 15 | 15. | 46.5 | 109.5 | 235.5 | 487.5 | 991.5 | 1999.5 | 4015.5 |
| STEP SIZE | 1 | 2 | 4 | 8 | 16 | 32 | 64 | 128 |

FIG. 3

| $\xi$ | $S_{k+n+1-\xi_{MAX}}$--- | $S_{k+n+2}$ | $S_{k+n-1}$ | $S_{k+n}$ | $S_{k+n+1}$ | $S_{k+n+2}$ | ---$S_{k+n+1+\xi_{MAX}}$ |
|---|---|---|---|---|---|---|---|
| 0 | – | – | – | – | 1 | 0 | --- 0 |
| 1 | – | – | – | 1 | 0 | 0 | |
| 2 | – | – | 1 | 0 | 0 | 0 | |
| 3 | – | 1 | 0 | 0 | 0 | 0 | |
| ⋮ | | | | | | | |
| $\xi_{MAX}$ | 1 --- | 0 | 0 | 0 | 0 | 0 | |

FIG. 6A
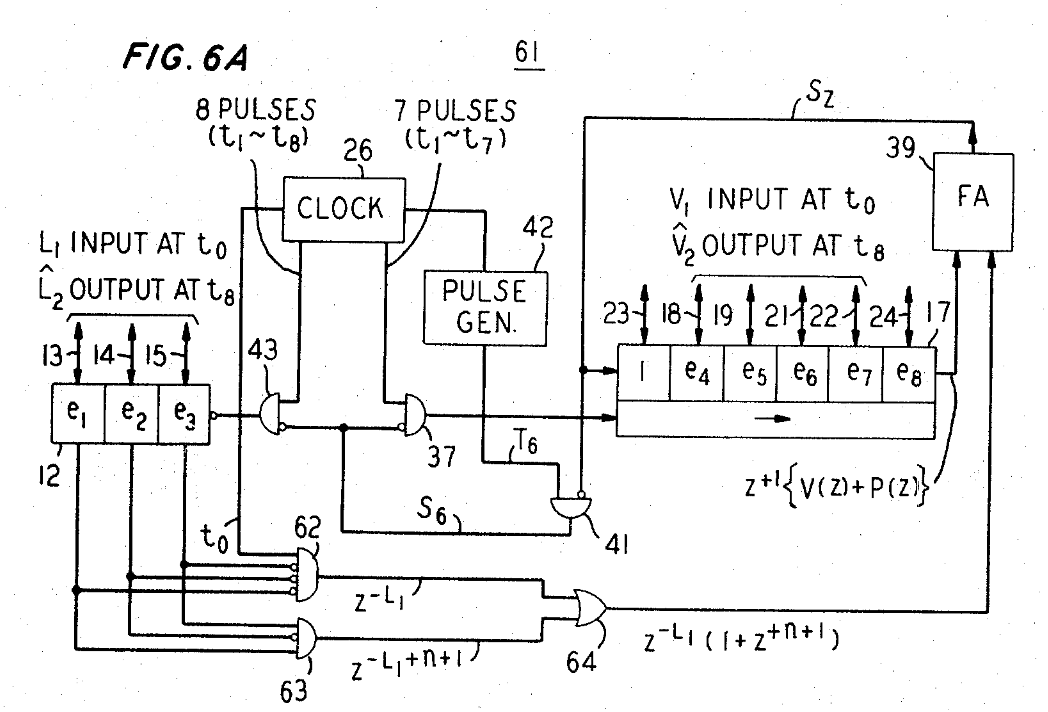
FIG. 6B
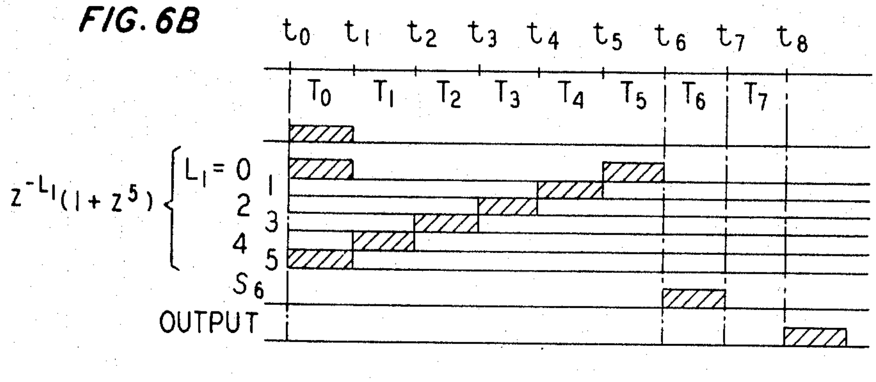
FIG. 7
$S_i$ SEQUENCE FOR 6db ATTENUATOR
| $\varepsilon$ | $S_5$ | $S_6$ | $S_7$ | SHIFT REGISTER | BC |
|---|---|---|---|---|---|
| 0 | - | 1 | 0 | ONE MORE SHIFT | – |
| 1 | 1 | 0 | 0 | STOP | INHIBIT |

DIGITAL ATTENUATOR

BACKGROUND OF THE INVENTION

1. Field of the Invention

This invention relates to digital signal processing and, more particularly, to the processing of nonlinear Pulse Code Modulation (PCM) signals.

PCM signals consist, in general, of a series of binary code words, wherein each word represents an instantaneous value of a periodically sampled and quantized analog signal. In normal usage, these code words are transmitted in the form of a serial bit stream to a receiving station where they are decoded into a reconstructed version of the original analog signal. Various operations and processing of the digital signal are preferably performed on the PCM words or bit stream as opposed to reconstructing the analog signal and then re-encoding it.

An operation frequently called for in digital signal transmission is signal attenuation. Attenuation is useful in echo suppression, for example, which is utilized in long-haul telephone transmission systems. In those periods of time when both parties in a long distance hook-up are speaking simultaneously, echo suppressors at each end of the system are employed to reduce the gain of the signal transmitted to the opposite end, thereby reducing the ringing and echo heard by the two parties. Obviously, where such attenuation can be performed on the PCM signal directly greater simplicity and flexibility can be achieved.

2. Description of the Prior Art

The most obvious way for attenuating a signal is to reproduce the analog signal from the PCM signal, attenuate it, and then re-encode it in PCM format. Such an arrangement is, however, unduly complex and expensive and compounds the signal noise which is a natural concomitant of quantizing.

Where the PCM code is linear, i.e., having no compression or expansion, it can be seen that a simple shifting of the digits can produce attenuation in powers of two. Since we are dealing with a binary code format, a right shift of one time slot produces a division by two. On the other hand, where the PCM code is nonlinear, e.g., compressed code, a simple shift does not produce uniform attenuation. An example of such a nonlinear code is given in U. S. Pat. No. 3,015,815 of H. Mann, issued Jan. 2, 1962, and assigned to the present assignee. That patent deals with an arrangement for generating a segmented code, which is suitable for generating the so-called mu Law code. The following discussion deals primarily with a mu Law code were mu=255 for purposes of illustrating the principles of the invention. These principles are, however, applicable to numerous other compressed code arrangements such as, for example, the so-called A-Law code.

Of particular interest in the telephone art is the eight-bit mu Law code characterized by the form $e_s$, $e_1e_2e_3e_4e_5e_6e_7$ where $e_s$ is the sign bit, $e_1e_2e_3$ define the particular segment of the code and are designated characteristic bits, and $e_4e_5e_6e_7$ define the position on the segment and are designated mantissa bits. As will be more apparent hereinafter, such a code format can replace a fourteen digit linear code, including one sign digit, with a minimal degradation of the signal.

With such a code, one method of achieving attenuation, or multiplication, has been to convert the compressed code to a linear code, attenuate and reconvert to the compressed code. Obviously it would be advantageous to operate directly on the compressed code in the interests of both efficiency and cost.

SUMMARY OF THE INVENTION

The present invention is based upon an algorithm which defines the attenuation operation in a manner such that the required attenuator may be synthesized therefrom for virtually any desired amount of attenuation, or, more generally, multiplication. As mentioned heretofore, the invention will be described in terms of the eight-bit mu Law code, although it is to be understood that it is not restricted to such a code.

In an illustrative embodiment of the invention, the three characteristic bits are applied in parallel to a three place binary counter and the mantissa bits are simultaneously applied in parallel to a shift register. Also applied to the shift register are a segment edge parameter digit, as will be explained more fully hereinafter, and a digit representative of the number of quantizing steps in a segment. The shift register also has additional cells, the number of which is governed by the amount of attenuation.

Under control of a clock, the counter counts up for eight pulses, and the outputs of each place of the counter are applied to an inverted AND gate. At a particular time which depends upon the segment number of the applied signal, all three places in the counter will have a zero, at which time the inverted AND gate produces a pulse output. This output is applied to pulse generating circuit which produces a pulse sequence determined by the attenuation factor, number of mantissa bits, and multiplier delay, as will be explained more fully hereinafter. The pulse sequence is applied to a full adder circuit.

At the ninth pulse from the clock, the counter ceases to count up and the shift register commences to shift, the clock pulses being applied through a second AND gate which also has an inverted input. The output of the shift register is serially fed to a multiplier circuit whose output is applied to the full adder. The output of the full adder is serially fed back to the shift register which continues to shift until the occurrence of three consecutive zeroes at its input and first two cells, which are applied to an inverted AND gate which is also under control of the clock. As will be more apparent hereinafter, the three consecutive zeroes must occur during a specified time interval determined by the maximum attenuation and number of mantissa bits. When this occurs, a pulse is produced at the output of the inverted AND gate which is applied to the inverting input of the second AND gate which is applying clock pulse to the shift register, thereby stopping the register shift. This same pulse is also applied to still another AND gate along with clock pulses, and the output of that gate is applied to the counter to cause it to count down the required number of places. At the end of the countdown, the counter has stored in it the characteristic bits of the attenuated signal and the shift register has stored in it the mantissa bits of the attenuated signal. These are then extracted on the same leads by which the unattenuated signal was applied.

As will be apparent hereinafter, the foregoing circuit arrangement is capable of performing a wide range of attenuation, not being limited to a single attenuation factor, such as 6 db attenuation. In addition, the attenuation is accomplished without resort to decoding or expanding the digital signal.

BRIEF DESCRIPTION OF THE DRAWINGS

The various features of the present invention will be more readily understood from the following detailed description, taken in conjunction with the drawings, in which:

FIG. 2 is a table which shows the analog output levels of a mu Law compressed code;

FIG. 3 is a logic table illustrating the variations in value of one parameter of the attenuation algorithm in accordance with the variations of another parameter;

FIG. 6A is a block diagram of a 6 db attenuator in accordance with the principles of the invention;

FIG. 6B is a timing chart of the circuit of FIG. 6A; and

FIG. 7 is a table illustrating the values of certain parameters of the attenuation algorithm for the circuit of FIG. 6A.

DETAILED DESCRIPTION

Figures 1, 4:
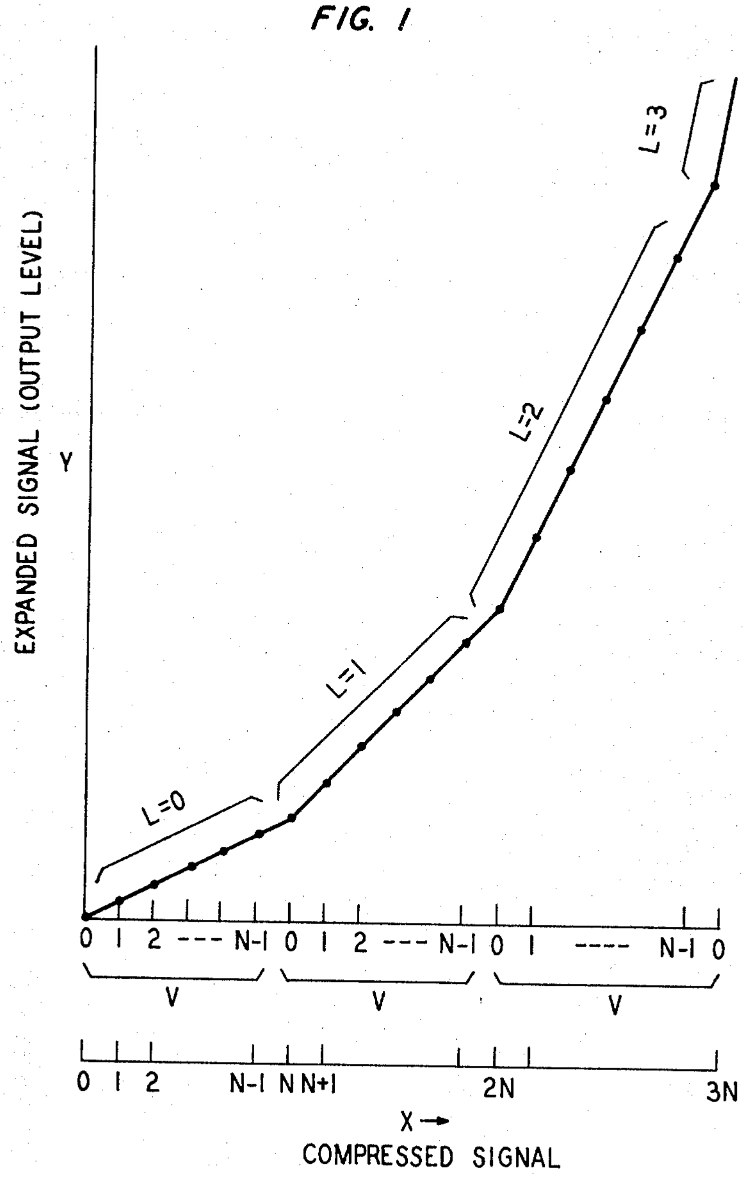
FIG. 1 is a diagram illustrating a mu Law code.
FIG. 4 is a table illustrating the values of certain parameters of the attenuation algorithm.

In considering segmented compressed codes, the compressed code X is composed of $m$ binary digits, called "characteristic bits" representing the segment number $L$, and $n$ binary digits called "mantissa bits" representing the quantizing step V in a segment. The total number M of segments in one polarity is equal to $2^m$ and the total number $N$ of quantizing steps is equal to $2^n$. The compressed digital signal is then given by $$X(L,V) = V + NL \tag{1}$$

and the expanded or linearized signal is given by $$Y(L,V) = \Delta L(V+P) - Q \tag{2}$$

where, for the mu Law $$\Delta L = 2^L$$
$$P = N + a$$
$$Q = N + a - c \tag{3}$$

where $a$ is the segment edge parameter, that is, it represents the transition from one segment to the next, and typically has a value of 0.5, and $c$ is the centering parameter, that is, the offset of the curves from the origin. In FIG. 1 there is shown a representation of a mu Law code, where $c = 0$. In an article entitled "A Unified Formulation of Segment Companding Laws and Synthesis of Codes and Digital Compandors" by H. Kaneko, *Bell System Technical Journal*, Vol. 49, No. 7, (Sept. 1970) pp. 1555–1588, the foregoing is set forth, as well as a detailed explanation of FIG. 1, which corresponds to FIG. 1 of that article. In that article it is also shown that tracking error is zero and the algorithms simplified for $a = 0.5$. Henceforth we shall consider $c = 0$ and $a = 0.5$. Furthermore, to simplify the discussion that follows, we assume $N = 16$ ($n = 4$) and $M = 8$ ($m = 3$). The eighth bit of the compressed code is the sign bit. FIG. 2 is a table which shows the analog output levels Y from Equation (2). From the table it can be seen that a 13-bit linear code is required to represent the range of values encompassed by the magnitude of the signal. An additional sign bit is required to represent the sign of the signal. In general, the shortest linear binary code capable of encompassing an $(m + n)$ bit compressed mu Law code with $a = 0.5$ and $c = 0$ contains $(2^m + n + 1)$ bits, exclusive of the sign bit.

Inasmuch as serial logic with the least significant bit occurring first is the most convenient and economical for digital multiplication, we rewrite Equation (2) in the form $$Y(z) = z^L(V(z) + P(z)) - Q(z) \tag{4}$$

where the operator $z$ represents multiplication by 2 and at the same time a delay of one clock interval involved in sequential logic. Where $L$ is represented by characteristic bits $e_1e_2e_3$ and $V$ by mantissa bits $e_4e_5e_6e_7$, then $$L = \sum_{r=1}^{3} e_r z^{3-r} \tag{5}$$

and $$V = \sum_{r=4}^{7} e_r z^{7-r} \tag{6}$$

Combining Equations (4), (5) and (6) produces $$Y(z) = z^L(e_7+e_6z+e_5z^2+e_4z^3+z^4+z^{-1}) - z^{-1} - z^4 \tag{7}$$

where the $z^{-1}$ term is $a$, and the $z^4$ term is $N$.

In approaching the attenuation problem, it is best to consider first the tandem arrangement of digital expandor, multiplier, and compresser. The multiplication may be expressed by $$Y_2 = AY_1 = A[2^{L_1}(V_1 + P_1) - Q] \tag{8}$$

where $Y_2$ is the output signal of the multiplier $Y_1$ the input signal, and $A$ the multiplication factor, which, for attenuation, is less than 1. By definition $$Y_2 = 2^{L_2}(V_2 = P_2) - Q_2. \tag{9}$$

In the present example $Q_1 = Q_2 = Q = N+a = P_1 = P_2 = P$.

Solving for $(V_2 + P)$ in Equations (8) and (9) gives $$W_2(L_2,Y_2) = 2^{-L_2}\{A[2^{L_1}(V_1 + P) - Q] + Q\} \tag{10}$$

where $W_2(L_2,Y_2)$ is $(V_2 + P)$. Inasmuch as we wish to perform the operation in sequential steps, as noted heretofore, we characterize the transfer function of A by $$A(z) = \sum_{k=0}^{K} \alpha_k z^{K-k} \tag{11}$$

which takes into account the fact that there is a delay of K clock intervals in the multiplier, $\alpha_k = 0, 1,$ or $-1$ and represents each successive delay in the multiplication process. For example, where the multiplication factor is ½i.e., 6 db attenuator, all $\alpha_k = 0$ except for $k = 1$, since there is only one multiplication step. On the other hand, for multiplication by ⅛, $K = 3$ and $\alpha_1 = 0$, $\alpha_2 = 0_1$, $\alpha_3 = 1$. Combining Equations (10) and (11) produces $$W(z) = z^{-L_2}[A(z)/z^K \{z^{L_1}(V_1(z) = P(z)) - Q(z)\} + Q(z)]$$

12 which can be modified to be $$z^{K+1}W(z) = z^{\xi}[A(z)\ \{zV_1(z)+z^{n+1}+1\}+z^{-L_1}(1+z^{n+1})(z^K-A(z))]$$

13 where $\xi = L_1 - L_2$
or $$z^{K+1}W(z) = z^{\xi}S(z)$$

14

The compression algorithm may be expressed as $$W(z) \mid t_{=}n = 1$$

15

$$W(z) \mid t > n = 0$$

which follows from the fact the $W(z)$ is a least significant digit first Sequence in which the least significant digit occurs at $t_0$ and the most significant digit $2^n = N$ occurs at $t_n$. In addition, when the correct segment value is reached $N \leq W \leq 2N$. From Equations (13), (14) and (15) we can define the compression algorithm as $$S(z) \mid t_{=}K_{+}N_{+}1_{-\xi} = 1$$

16

$$S(z) \mid\ > K_{+}n_{+}1_{-\xi} = 0$$

In FIG. 3 there is shown a logic table for $S_t = S(z) \mid t_1$ for the range of $\xi \epsilon \{0, 1 \ldots \ldots \xi_{Max}\}$. It can be seen from FIG. 3 that if the sequence $S(z)$ is applied to a $\xi_{Max}$ bit tapped delay line, the output of $(\xi_{Max}+1)$ taps becomes 1 followed by $(\xi_{Max}-1)$ zeroes at time $t = K+n+1+\xi_{Max}-\xi$. From this $\xi$, and hence $L_2$ can be obtained. The value of $\xi$ is 0 or 1 if $z^{-1} \leq A < 1$ and in general, if $2^{-\xi_{Max}} \leq A < 1$, $\xi$ takes the values 0 through $\xi_{Max}$.

For a better understanding of the foregoing, consider multiplication of, for example, the number 53.5 by ¼. From FIG. 2 we see that 53.5 is represented by $L = 2$ and $V = 1$ (binary 0001). Division of 53.5 by 4 yields 13.375 which is truncated to 13, which is given by $L_2 = 0$ and $V_2 = 13$ (binary 1101). For $A = ¼ K = 2$, $A(z) = 1$, and $\xi = \xi_{Max} = 2$. In addition, $V_1(z) = z^0$ and $n = 4$. The quantity $S(z)$ from Equation (13) thus becomes $$S(z) = (z + z^5 + 1) + Z^{-2}(1 + z^5)(z^2 - 1).$$

17

Inasmuch as the term $(z^2 - 1)$ represents a series of two pulses, it can be written as $(1 + z)$ to make all coefficients of powers of $z$ positive. Equation (17) thus becomes $$S(z) = z^{-2} + z^{-1} + 1 + z + z^3 + z^4 + z^5.$$

18

Since this is a least significant digit first sequential notation, the powers of $z$ are in one to one correspondence with the clock instants, and their coefficients correspond to the values of S(z) at these instants. This is illustrated in the table of FIG. 4.

Inasmuch as $K+n+1-\xi = 5$, $S_5 = 1$ as required from Equation (16) and the $(\xi_{Max} + 1)$ bit sequence needed to detect $\xi$, namely $S_5, S_6, S_7$ is 100 as expected from the discussion of FIG. 3. With $\xi = 2$ and $L_1 = 2$, $L_2$ is 0.

From Equation (14), $$W(z) = z^{\xi}/z^{K+1}\ S(z) = z^2/z^3\ S(z) = z^{-1}\ S(z).$$

19

Combining (18) and (19) and subtracting $N = z^4$, from FIG. 4 it can be seen that the mantissa of the attenuated signal $X_2$ is 1101 which is the number 13. Thus the complete signal $X_2$ becomes 0001101, as expected.

It should be noted that the foregoing process has introduced an error of 0.375 due to the necessity of truncating the attenuated signal. This granular effect is a characteristic of attenuators that operate on compressed codes, and in general is well within acceptable limits.

Figure 5:
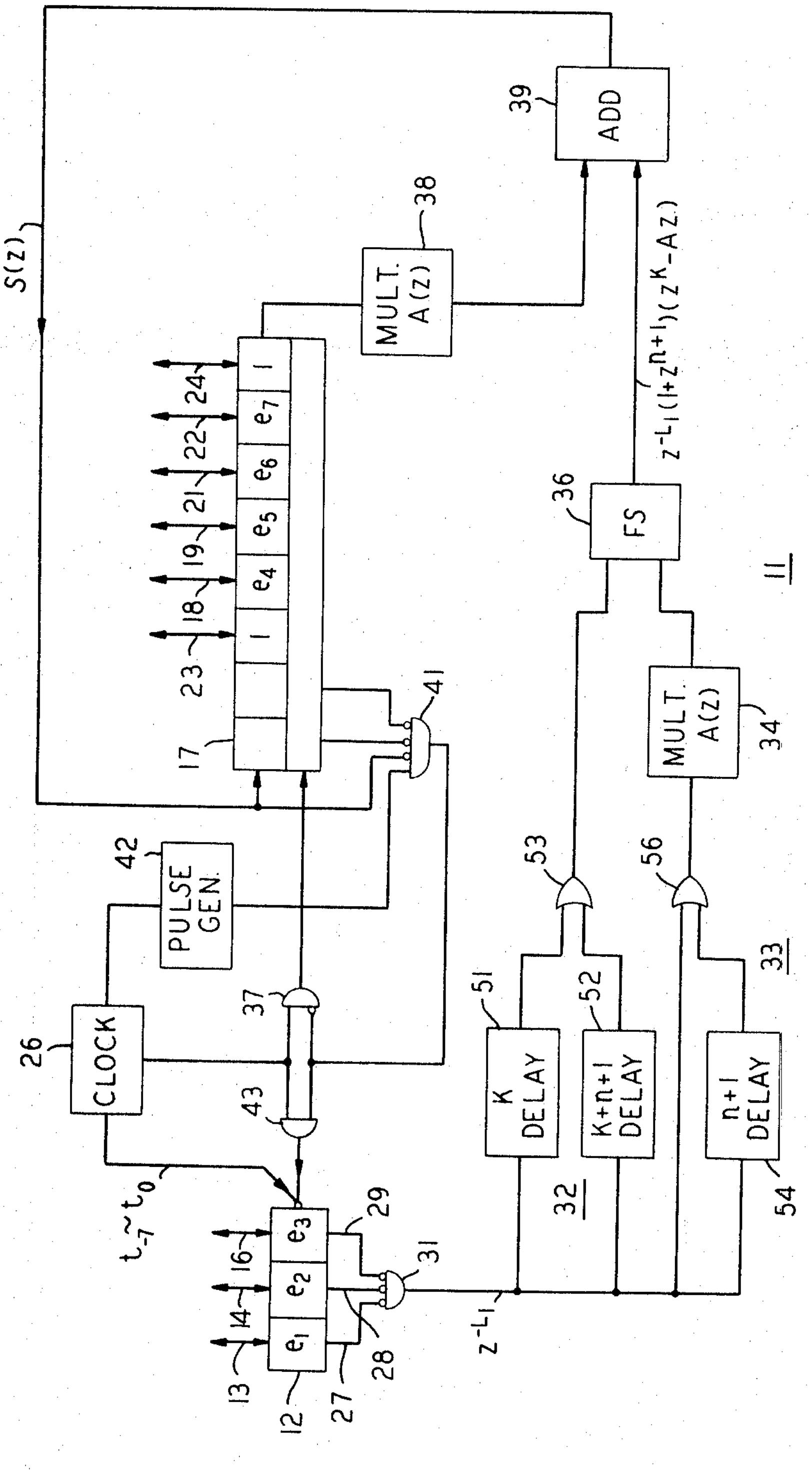
FIG. 5 is a block diagram of an attenuator circuit according to the principles of the present invention.

In FIG. 5 there is depicted in block diagram an attenuator 11 which performs in accordance with the algorithms represented by Equations (13), (14) and (15). The attenuator 11 is for a mu Law code where $m = 3$, $n = 4$, $a = 0.5$ and $c = 0$.

The characteristic bits $e_1e_2e_3$ representing $L_1$ are applied to a three cell counter circuit 12 over leads 13, 14 and 16 respectively. At the same time, the mantissa bits are applied to a shift register 17 having $(n + \xi_{Max} + 1)$ cells, where, for illustrative purposes, $\xi_{Max}$ is given the value 3, hence register 17 has eight cells. Bits $e_4e_5e_6e_7$ are applied to register 17 over leads 18, 19, 21 and 22 respectively. The function of shift register 17 is to store and feed out sequentially the first bracketed term within the large brackets of Equation (13). To this end, the term $z^{n+1}$ is applied over lead 23 to the register cell immediately preceding the most significant bit, $e_4$. Also the digit one is applied over lead 24 to the shift register cell immediately following the least significant bit $e_7$.

After the bits of the signal $X_1$ are stored as set out in the foregoing, a clock pulse source commences to apply pulses to counter 12 to count up. For convenience the initial counting pulse time slot is labled $t_{-7}$ and the count continues to time slot $t_0$. With $L_1$ stored in the counter, the counter will have a zero output on each of its three leads 27, 28, 29 at time slot $t_{-L}$. The leads 27, 28, 29 are each connected to an inverted input of an AND gate 31, hence at time slot $t_{-L_1}$ gate 31 emits a pulse represented by $z^{-L_1}$. This pulse is applied in parallel to a first delay circuit 32 which comprises a delay circuit 51 of K intervals and a delay circuit 52 of $K+n+1$ intervals whose outputs are applied to an OR gate 53 and which delays it for K clock intervals and for $K+n+1$ clock intervals and a second delay circuit 33 which comprises a delay circuit 54 of n+1 intervals and an OR gate 56 and which passes the pulse straight through and also delays it $n+1$ intervals. Thus the outputs of both circuits 32 and 33 are each two pulses, that is, $z^{-L_1}$ delayed for two different intervals in each case. The output of circuit 33 is applied to a multiplier 34 which multiplies it by the factor $A(z)$. The outputs of multiplier 34 and of delay circuit 32 are applied to a full subtractor circuit 36, whose output is a pulse train represented by $z^{-L_1}(1+z^{n+1})\ (z^K-A(z)\ )$ which is the second termed within the large brackets of Equation (13).

At time $t_1$, clock 26 commences to apply pulses to an AND gate 37 whose other input is an inverted input. Assume for the moment that there is no input to the inverted input, then at time $t_1$ gate 37 applies a pulse to shift register 17, shifting the stored data one place to the right. Each successive clock pulse shifts the shift register, the output of which is applied to a multiplier circuit 38 which multiplies the sequential, least significant digit first output by the factor $A(z)$. The output of multiplier 38 is applied to one input of a full adder 39 while the output of subtractor circuit 36 is applied to the other input of adder 39. The output of adder circuit 39 is then $S(z)$ as given in Equations (13) and (14).

The output of adder 39 is fed back to the first sequential input of shift register 17 and to one inverted input of an AND gate 41. As register 17 continues to shift under pulses from gate 37, the information in the first cell becomes $zS(z)$ and in the second cell it is $z^2S(z)$. As pointed out in the discussion of FIG. 3, when $t = t_{K+n+1+\xi Max}$, $-\xi$, the output of $\xi_{Max}+1$ taps becomes 1 followed by $\xi_{Max}-1$ zeroes. To achieve this, a pulse generator 42, under control of the clock 26 generates a single long pulse commencing at $t_{K+n+1}$ and lasting until $t_{K+n+1+\xi Max}$. During the duration of this pulse, when $S(z)$, $z^1S(z)$, and $z^2S(z)$ are all zero, gate 41 produces a pulse. This pulse which is $\xi$ intervals long inhibits gate 37, thereby freezing register 17, and activates and AND gate 43 which causes counter 12 to count down. Since at $t_0$, when counter 12 ceased to count up, $L_1$ was stored therein, gates 41 and 43 cause counter 12 to count down $\xi$ places, thereby producing $L_2$.

At time $t_{K+n+1+\xi Max}$, shift register 17 has stored therein $V_2$ and counter 12 has stored therein $L_2$. The characteristic $L_2$ may then be read out on leads 13, 14 and 16 and the mantissa $V_2$ may be read out on leads 18, 19, 21 and 22. The sign bit may be treated separately. It will be the same for both $X_1$ and $X_2$.

All of the components of the circuit of FIG. 5 are known types of circuits within the purview of one skilled in the art. The invention principally resides in the assemblage of components in accordance with the algorithm of Equations (13), (14) and (15) to produce an attenuator which operates directly on the compressed signal.

The attenuator circuit of FIG. 5 is a generalized circuit for a wide range of attenuation. A very useful attenuator is the so-called 6 db attenuator for operation directly on nonlinear codes. An example of such an attenuator is shown and described in U. S. Pat. No. 3,688,097 of W. L. Montgomery, which issued Aug. 29, 1972, and assigned to the present assignee. The attenuator disclosed in that application is designed to operate with the mu Law segmented code.

In FIG. 6A there is shown a 6 db attenuator circuit constructed in accordance with the principles of the present invention as set forth in the foregoing. In the attenuator circuit 61 of FIG. 6A, $A = ½$, $K = 1$, $\xi_{Max} = 1$, $A(z) = 1$ and $z^K - A(Z) = 1$. From Equation (16) the $\xi$ choosing criteria become $$S(z)|_{t=6-\xi}=1$$

$$S(z)|_{t>6-\xi}=0\ .$$

This is illustrated in the table of FIG. 7.

In the circuit diagram of FIG. 6A those elements which duplicate the elements of the circuit of FIG. 5 as to function have been given the same reference numerals, and, inasmuch as the operation of the circuit 61 of FIG. 6A is substantially the same as that of the circuit of FIG. 5, only the differences will be discussed.

In the 6 db attenuator 61 of FIG. 6A, the output resulting from counting up in counter 12 is applied to a first AND gate 62 which is enabled at time $t_0$ only, and disabled thereafter. Thus if $L_1 = 0$, gate 62 passes a pulse, $z^{-L_1}$. For all other values of $L_1$, gate 62 is disabled. The last term within the brackets in Equation (13) is $z^{-L_1}(1+z^{n+1})$.When the term $z^{-L_1+n+1}$ appears in digital form 101 at the output of counter 12 during the count up, AND gate 63 passes a pulse. The outputs from gates 62 and 63 are applied to an OR gate 64 whose output is the required term $z^{-L_1}(1+z^{n+1})$, which is applied to adder 39.

As was the case in FIG. 5, the output of shift register 17 is also applied to adder 39, ($A(z)$ being 1) and the output of adder 39 $S(z)$ is fed back to the input of register 17. From Equation (20) and FIG. 7 it can be seen that $S_{16}$ is the determinant of $\xi$. Thus AND gate 41 is enabled at time $t_6$, and when $S_6$ is equal to one, one more shift occurs, then gate 43 is inhibited and the counter 12 stops.

The timing chart of FIG. 6B illustrates the values of the output of OR gate 64 at the various time slots for differing values of $L_1$. The output of gate 41, $S_6$ is equal to the complement of $\xi$ and one out of eight clock pulses to the counter is inhibited. This results in $L_2 = L_1 - \xi$. The outputs $L_2$ and $V_2$ are obtained at time $t_8$ on leads 13, 14, 15 and 18, 19, 21 and 22.

The foregoing illustrates the principles of the present invention, which are based upon an attenuation algorithm as given in Equations (13), (14) and (15). The various elements of the circuits disclosed, such as the counters, shift registers, delay circuits, multipliers, adders, subtractors, gates, and pulse generators may all be constructed by known techniques given the various operating parameters set forth in the foregoing. Numerous applications of these principles will occur to workers in the art without departing from the spirit of the invention.

What is claimed is:

1. A digital attenuator for directly attenuating a nonlinear segmented code wherein the code consists of a first group of $m$ characteristic digits $e_1e_2$- -$e_m$ defining the segment and a second group of $n$ mantissa digits $e_1e_2$ - -$e_n$ defining the position on the segment, an $m$ cell binary counter to which the characteristic digits are applied in parallel, a shift register to which the mantissa digits are applied in parallel, said shift register having $n + \xi_{Max} + 1$ cells where $\xi_{Max}$ is the maximum possible change in segment between the unattenuated and attenuated signals, a first AND gate having at least one inverted input, each input being connected to one cell of said binary counter, a source of clock pulses, means for applying clock pulses to said binary counter to cause it to count for a predetermined number of pulses during which count said first AND gate produces a pulse output, delay means for producing from said first AND gate pulse output one or more pulses delayed in time a predetermined amount, means including a second AND gate for applying clock pulses to said shift register to cause it to produce a sequential pulse output, multiplying means for multiplying the output of said shift register by an attenuation factor, adding means for adding together the outputs of said delay means and said multiplying means and feeding the sum back to a sequential input to said shift register, a third AND gate having $\xi_{Max}$ inverted inputs connected to said shift register and an enabling input under control of said source of clock pulses, means for inhibiting the counting action of said counter and the shifting action of said shift register comprising an inverted input to said second AND gate and a fourth AND gate connected to said counter, the output of said third AND gate being applied thereto, and means for extracting in parallel the digital information in said counter and said shift register.

2. A digital attenuator as claimed in claim 1 wherein said delay means comprises a first delay circuit for delaying the said first AND gate output pulse $K$ clock intervals where $K$ is the number of clock intervals involved in the multiplication process, a second delay circuit for delaying the said first AND gate output pulse $K+n+1$ intervals, the outputs of said first and second delay circuits being applied to the inputs of a first OR gate, a second OR gate, means for applying the said first AND gate output pulse directly to one input of said second OR gate, a third delay circuit for delaying the said first AND gate output pulse $n+1$ intervals, the output of said third delay circuit being applied to an input of said second OR gate, multiplying means for multiplying the output of said second OR gate by a multiplication factor, and means for subtracting the output of said multiplying means from the output of said first OR gate.

3. A digital attenuator as claimed in claim 1 wherein said delay means includes said first AND gate and a fifth AND gate, said first AND gate having three inverted inputs, each connected to a separate cell of said counter, and an enabling input connected to said source of clock pulses, said fifth AND gate having a single inverted input and two enabling inputs, each connected to a separate cell of said counter, and an OR gate having its inputs connected to the outputs of said first and fifth AND gates, the output of the OR gate being connected to one input of said adding means.

4. A digital attenuator as claimed in claim 1 wherein a pulse generator is connected in series between said source of clock pulses and the enabling input of said third AND gate.

5. A digital attenuator for directly attenuating a nonlinear segmented signal code wherein the code consists of a first group of $m$ characteristic digits $e_1e_2 \cdot \cdot e_m$ defining the segment L and a second group of $n$ mantissa digits $e_1e_2 \cdot \cdot e_n$ defining the quantizing step V in the segment, said attenuator comprising a source of clock pulses $t$ and means for performing on the unattenuated signal $L_1V$, under control of the clock pulses, the algorithm $$z^{K+1} W(z^{\xi}) = z^{\xi} S(z)$$

where $z$ is an operator representing multiplication by two and one clock interval delay, $K$ is the number of clock intervals delay in the multiplication process, $\xi = L_1 - L_2$ where $L_1$ is the segment term of the unattenuated signal and $L_2$ is the segment term of the attenuated segment code, $W(z)$ represents the attenuated signal, and $S(z)$ is given by $$A(z)\ (zV_1(z) + z^{n+1} + 1) + z^{-L_1}(1 + z^{n+1})\ (z^K - A(z))$$

where $A(z)$ is the transfer function of the attenuation factor, and $V_1(z)$ is the mantissa term of the unattenuated signal, said means for performing the algorithm comprising a binary counter and delay network for generating the term $z^{-L_1}(1+z^{n+1})\ (z^K - A(z))$, a shift register and multiplier for generating the term $A(z)\ (zV_1(z) + z^{n+1} + 1)$, adder means for combining the two terms to produce $S(z)$, means for applying $S(z)$ to a serial input of the shift register, and means for monitoring the input to the shift register to produce a signal to stop the binary counter when $L_2$ is stored therein and to stop the shift register when $V_2$ is stored therein, where $V_2$ is the mantissa of the attenuated signal, and means for extracting the attenuated signal $L_2V_2$ from the counter and shift register.

6. A digital attenuator as claimed in claim 5 wherein the means for monitoring comprises a first AND gate having $\xi_{Max}$ inverted inputs, where $\xi_{Max}$ is the maximum possible change in segment between the unattenuated and attenuated signals, and an enabling input, and means for enabling said first AND gate for a time period from $t_{K+n+1}$ to $t_{K+n+1+\xi_{Max}}$ comprising a pulse generator connected in series between said source of clock pulses and the enabling input of said first AND gate.

7. A digital attenuator as claimed in claim 6 wherein said shift register has $n + \xi_{Max} + 1$ cells and the serial input and the first two of said shift register cells are each connected to one of the inverted inputs of said first AND gate.

8. A digital attenuator as claimed in claim 7 and further including a second AND gate having an input connected to said source of clock pulses and an inverted input connected to the output of said first AND gate, the output of said second AND gate being connected to said shift register to control the shifting thereof.

9. A digital attenuator as claimed in claim 8 and further including means for causing said binary counter to count down when there is an output from said first AND gate comprising a third AND gate having one input connected to said source of clock pulses and its other input connected to the output of said first AND gate, the output of said third AND gate being connected to said binary counter to cause it to count down.

10. A digital attenuator as claimed in claim 8 and further including means for causing said binary counter to stop counting, said means comprising a third AND gate having one input connected to said source of clock pulses and an inverted input connected to the output of said first AND gate, the output of said third AND gate being connected to said counter whereby said counter causes counting when there is an output from said first AND gate.

* * * * *